United States Patent [19]
Denman, Jr.

[11] Patent Number: 5,493,669
[45] Date of Patent: Feb. 20, 1996

[54] DATA PROCESSOR FOR SIMULTANEOUSLY SEARCHING TWO FIELDS OF THE RENAME BUFFER HAVING FIRST AND SECOND MOST RECENTLY ALLOGATED BITS

[75] Inventor: Marvin A. Denman, Jr., Austin, Tex.

[73] Assignee: Motorola, Inc., Schaumburg, Ill.

[21] Appl. No.: 25,453

[22] Filed: Mar. 3, 1993

[51] Int. Cl.$^6$ .................................. G06F 9/32; G06F 9/42
[52] U.S. Cl. ...................... 395/460; 395/375; 395/800; 395/461; 395/495; 364/938; 364/939.6; 364/948.31; 364/931.4; 364/931.41; 364/931.02; 364/DIG. 2; 364/255.7; 364/256.4
[58] Field of Search .................................. 395/800, 375, 395/575, 425, 400, 461, 495; 364/DIG. 1, DIG. 2

[56] References Cited

U.S. PATENT DOCUMENTS

| | | | |
|---|---|---|---|
| 4,521,851 | 6/1985 | Trubisky et al. | 395/375 |
| 4,631,660 | 1/1986 | Woffinden et al. | 395/400 |
| 4,731,739 | 3/1988 | Woffinden et al. | 395/250 |
| 4,901,233 | 2/1990 | Liptay | 395/375 |
| 4,903,196 | 2/1990 | Pomerene et al. | 395/375 |
| 4,991,090 | 2/1991 | Emma et al. | 395/575 |
| 5,003,462 | 3/1991 | Blaner et al. | 395/375 |
| 5,134,561 | 7/1992 | Liptay | 395/425 |
| 5,185,868 | 2/1993 | Tran | 395/375 |
| 5,226,126 | 7/1993 | McFarland et al. | 395/375 |

OTHER PUBLICATIONS

James E. Smith, "Implementing Precise Interrupts in Pipelined Processors", IEEE Transaction on Computer, vol. 37, No. 5, May, 1988, pp. 562–573.

C. J. Wang et al, "Area and Performance Comparison of Pipelined Risc Processors Implementing Different Precise Interrupt Mehods" IEEE Proceedings vol. 140, Jul. 1993.

G. C. Hwang et al, "New Hardware Scheme Supporting Precise exception Handling for Out-of Order Execution", Electronic Letters 6th Jan. 1994, vol. 30, No. 1.

Sohi, Gurindar S., Instruction Issue Logic for High-Performance, Interruptible, Multiple Functional Unit, Pipelined Computers, IEEE Transactions on Computers, vol. 39, No. 3, Mar. 1990.

Primary Examiner—Meng-Ai An
Attorney, Agent, or Firm—Lee E. Chastain

[57] ABSTRACT

A data processor has a plurality of execution units (12), a rename buffer (14) coupled to at least one of the execution units and a plurality of architectural registers (16) coupled to at least one execution unit and to the rename buffer. The rename buffer periodically receives and stores the result and periodically receives requests for the operand. Each received result and operand is associated with an architectural register. The rename buffer periodically forwards one of a set of received results to an execution unit. Each received result of the set is associated with the same architectural register. The rename buffer is operable to determine which entry is the most recently allocated among several that will update the same architectural register. This ability to both manage results destined for the same architectural register and to forward only the appropriate value increases data processor throughput and reduces instruction stalls.

2 Claims, 5 Drawing Sheets

| RENAME TAG | ARCHITECTURAL REGISTER FILE TAG | V | MRA | SHADOW BIT | DATA | DATA PRESENT |
|---|---|---|---|---|---|---|
| A | 4 | 1 | 1 | | | 1 |
| B | 5 | 1 | 1 | | | 0 |
| C | 7 | 1 | 1 | | | 0 |
| D | | 0 | | | | |
| E | | 0 | | | | |
| F | | 0 | | | | |
| G | | 0 | | | | |

*FIG. 3*

| RENAME TAG | ARCHITECTURAL REGISTER FILE TAG | V | MRA | SHADOW BIT | DATA | DATA PRESENT |
|---|---|---|---|---|---|---|
| A | 4 | 1 | 0 | | | 1 |
| B | 5 | 1 | 1 | | | 0 |
| C | 7 | 1 | 1 | | | 0 |
| D | 4 | 1 | 1 | | | 0 |
| E | | 0 | | | | |
| F | | 0 | | | | |
| G | | 0 | | | | |

*FIG. 4*

| RENAME TAG | ARCHITECTURAL REGISTER FILE TAG | V | MRA | SHADOW BIT | DATA | DATA PRESENT |
|---|---|---|---|---|---|---|
| A | 4 | 1 | 0 | 0 | | 1 |
| B | 5 | 1 | 1 | 1 | | 0 |
| C | 7 | 1 | 1 | 1 | | 0 |
| D | 4 | 1 | 1 | 1 | | 0 |
| E | | 0 | | | | |
| F | | 0 | | | | |
| G | | 0 | | | | |

FIG.5

| RENAME TAG | ARCHITECTURAL REGISTER FILE TAG | V | MRA | SHADOW BIT | DATA | DATA PRESENT |
|---|---|---|---|---|---|---|
| A | 4 | 1 | 0 | 0 | | 1 |
| B | 5 | 1 | 0 | 1 | | 0 |
| C | 7 | 1 | 1 | 1 | | 0 |
| D | 4 | 1 | 1 | 1 | | 0 |
| E | 5 | 1 | 1 | | | 0 |
| F | | 0 | | | | |
| G | | 0 | | | | |

FIG.6

| RENAME TAG | ARCHITECTURAL REGISTER FILE TAG | V | MRA | SHADOW BIT | DATA | DATA PRESENT |
|---|---|---|---|---|---|---|
| A | 4 | 1 | 0 | 0 | | 1 |
| B | 5 | 1 | 1 | 1 | | 0 |
| C | 7 | 1 | 1 | 1 | | 0 |
| D | 4 | 1 | 1 | 1 | | 0 |
| E | 5 | 0 | | | | 0 |
| F | | 0 | | | | |
| G | | 0 | | | | |

DATA PROCESSOR FOR SIMULTANEOUSLY SEARCHING TWO FIELDS OF THE RENAME BUFFER HAVING FIRST AND SECOND MOST RECENTLY ALLOGATED BITS

FIELD OF THE INVENTION

The present invention generally relates to digital computing systems, and more specifically to a data processor having out of order instruction execution or completion.

BACKGROUND OF THE INVENTION

Many data processor architectures now incorporate multiple execution units to simultaneously perform more than one instruction at a time. Such an architecture can greatly increase the throughput of a data processing system with respect to another system that has a single general purpose execution unit or that waits until a first instruction completes before beginning a second subsequent instruction. For instance, a data processor may have an integer execution unit, a floating point execution unit, a data execution unit and an instruction execution unit. Each of these execution units is only able to perform a few instructions. Collectively, however, they can perform a complete set of instructions required by a general purpose data processor. In addition, these four execution units may perform up to four separate instructions at the same time depending upon various factors.

Data processors that incorporate multiple execution units may be further classified by the protocol they follow when "writing back" instruction results to architectural registers. Write back is the procedure a data processor follows when it writes the results of a completed instruction to an architectural register. The data processor may either write back "in-instruction-order" or "out-of-instruction-order." The selection of a write back protocol is a compromise between hardware and software complexity. It is simpler to program an in-instruction-order data processor to handle interrupts and exceptions, for instance, than it is to program an out-of-instruction-order data processor to handle the same events. Conversely, it is simpler to design an out-of-instruction-order data processor than it is to design an in-instruction-order data processor.

An "in-instruction-order" data processor is one that updates architectural registers with the result of an instruction in the order in which the instructions appear in the original instruction stream. An in-instruction-order data processor may use a rename buffer to temporarily store its results prior to write back because the results may not necessarily complete in the original instruction order. Instructions may complete out of order because they began out of order, because different types of instructions take different amounts of time to complete, or both. In operation, the first result is written from the rename buffer to the appropriate architectural register once the first instruction completes. The second result is written from the rename buffer to the second architectural register once the second instruction completes and the first instruction is written back, etc.

An "out-of-instruction-order" data processor is one that updates architectural registers with the result of an instruction in the order in which the instructions complete in the various execution units. Once the execution unit completes the instruction, it writes its result directly to the architectural register without any consideration of instruction order. Therefore, the write back order of an out-of-instruction-order data processor may or may not coincide with the original instruction order.

Known in-instruction-order data processors have their complexity increased or their performance reduced to account for the large number of data dependencies that may exist among a group of instructions. These data dependencies must be accounted for if multiple instructions are to be executed simultaneously. For instance, an execution unit may require data from an architectural register that has yet to be determined by a previous instruction. The same architectural register unit may be modified by two or more previous instructions. In the first case, the execution unit must wait until the previous instruction completes before the data will be valid. In the second case, the execution unit must wait for the second previous instruction to complete before its data is valid. The execution unit, however, must not mistakenly read the value of the architectural register immediately after the first of the two previous instruction completes.

SUMMARY OF THE INVENTION

A data processor has a plurality of execution units, a plurality of architectural registers coupled to at least one execution unit and a rename buffer coupled to at least one of the execution units and to the rename buffer. The execution units perform an instruction set that has at least one instruction requiring an operand and that has at least one instruction generating a result. The architectural registers periodically receive the results of the execution units. The rename buffer also periodically receives and stores the result and periodically receives requests for the operand. Each received result and operand is associated with an architectural register. The rename buffer periodically forwards one of a set of received results to an execution unit. Each received result of the set is associated with the same architectural register.

In addition, a method of operating a data processor has the steps of storing a first tag and a first first-most-recently-allocated bit in a first memory element at a first time and storing a second tag and a second first-most-recently-allocated bit in a second memory element at a second subsequent time. The first tag and first first-most-recently-allocated bit are stored as a first set of a plurality of sets. The second tag and second first-most-recently-allocated bit are stored as a second set of a plurality of sets. Both the first and second memory element are ones of a plurality of memory elements. The first and second tags are representative of an address of a first and second memory cell, respectively, and are associated with a first and a second result, respectively. The first and second first-most-recently-allocated bits are associated with the first and second results, respectively, and assume a first logic state initially. At the second time, a second logic state is stored in a subset of the first-most-recently-allocated bits. The subset has those memory elements with tags logically equivalent to the second tag.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIGS. 3, 4, 5, 6 and 7 depict the contents of the rename buffer illustrated in FIG. 2 at various sequential times;

FIG. 8 depicts a flow chart of one set of steps operable to implement the disclosed invention;

DETAILED DESCRIPTION OF A PREFERRED EMBODIMENT

Figure 1:
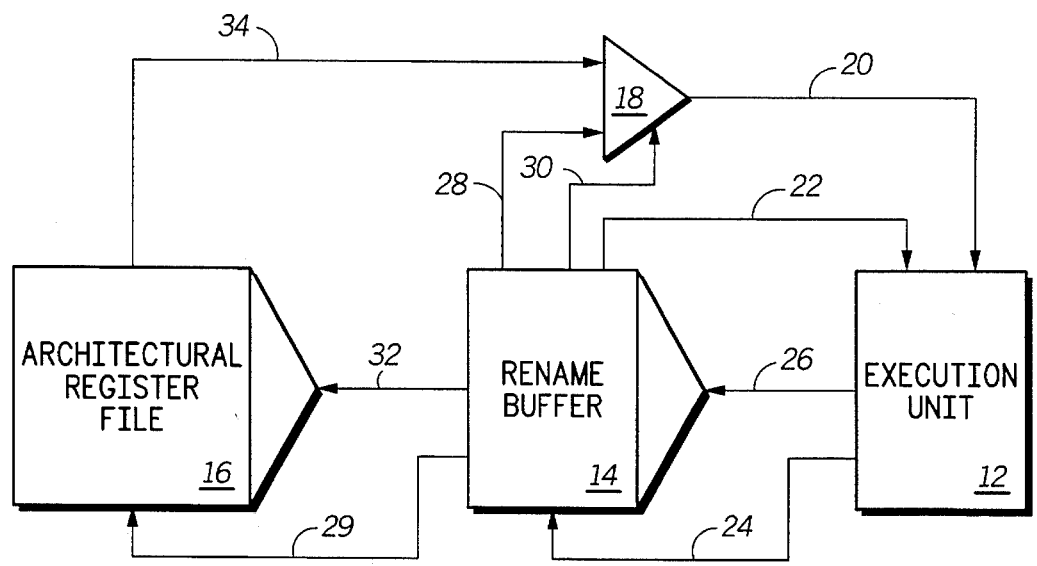
FIG. 1 depicts a block diagram of a data processor constructed in accordance with the present invention.

FIG. 1 depicts a block diagram of a data processor 10 constructed in accordance with the present invention. Data processor 10 has a plurality of execution units 12 (only one will be shown to simplify the following description), a rename buffer 14, an architectural register file 16, a forwarding circuit 18 and various buses that connect the blocks together. Architectural register file 16 has a plurality of architectural registers (not shown) to which instruction results are periodically written and from which operands are periodically forwarded. Rename buffer 14, execution unit 12 or a combination of the two may periodically write these results to architectural register file 16. As will be described below, rename buffer 14 may also forward operands to execution unit 12.

Forwarding circuit 18 forwards an operand and a data valid signal to execution unit 12 via an operand bus 20. Rename buffer 14 forwards a rename tag to execution unit 12 via a tag bus 22. Execution unit 12 generates a result on a result bus 24 and a result/request tag on a result/request tag bus 26. Execution unit 12 forwards both the result and the result/request tag to rename buffer 14. Rename buffer 14 forwards an operand and a data valid signal on an operand bus/RB 28. Rename buffer 14 also forwards its operands to architectural register file 16 according to a predetermined protocol via a write back bus 29. Rename buffer 14 typically writes back or updates architectural register file 16 in the same order as appeared in the original instruction stream order. Rename buffer 14 indicates that it does or does not contain a requested operand on a "Hit/Miss" signal 30. Rename buffer 14 forwards its operand, the data valid signal and the Hit/Miss signal to forwarding circuit 18. Rename buffer 14 forwards operand requests to architectural register file 16 on a forward result/request tag bus 32. Architectural register file 16 forwards operands and a data valid signal to forwarding circuit 18 on an operand bus/ARF 34.

According to the disclosed invention, rename buffer 14 may contain a set of results destined for the same architectural register within architectural register file 16. Rename buffer 14 is able to determine which result within the set of results should be forwarded to execution unit 12 when execution unit 12 requests an operand from the destined architectural register. This set selection ability allows data processor 10 to issue more instructions before "stalling" or before pausing instruction issue. Known data processors will stall when an upcoming instruction indicates that the instruction will write back its result to an architectural register that is already the target of an issued but unfinished instruction. According to the disclosed invention, a data processor may continue to issue instructions until its rename buffer is full. It is presently easier to enlarge a rename buffer than it is to limit the sequence of destination registers of an instruction stream. The sequence of destination registers of an instruction stream might be limited, for instance, by a software compiler.

It should be readily understood that FIG. 1 depicts a highly simplified and only partial data processor 10. Those portions of data processor 10 known in the an and not directly involved with the disclosed invention have been omitted to more clearly illustrate the described invention.

Data processor 10 is an example of a class of data processors that execute multiple instructions simultaneously by dispatching multiple instructions to multiple execution units. However, data processor 10 requires that the various results produced by its execution units be written back to the architectural registers in an order corresponding to the order in which the instructions that generated the results appeared in the original instruction stream. For example, the first instruction in the instruction stream must write back to its designated register in architectural register file 16 before any other instructions do so. The second instruction in the instruction stream must write back to its designated register in architectural register file 16 only after the first instruction writes back to architectural register file 16, etc. It may be difficult to guarantee the write back order of a series of instructions if the instructions require differing amounts of time to complete, if the instructions begin executing in a different order, or both.

Rename buffer 14 receives and stores the results of execution unit 12 until it can forward the results to a register within architectural register file 16 in the prescribed order. This control is provided by another portion of data processor (not shown) typically referred to as a "sequencer" or the like. Rename buffer 14 is also able to forward a requested result or a tag corresponding to the future location of the requested result in rename buffer 14 directly to execution unit 12. This forward feature of rename buffer 14 allows execution unit 12 to begin another instruction even if rename buffer 14 has not yet updated the architectural register file 16.

Figure 2:
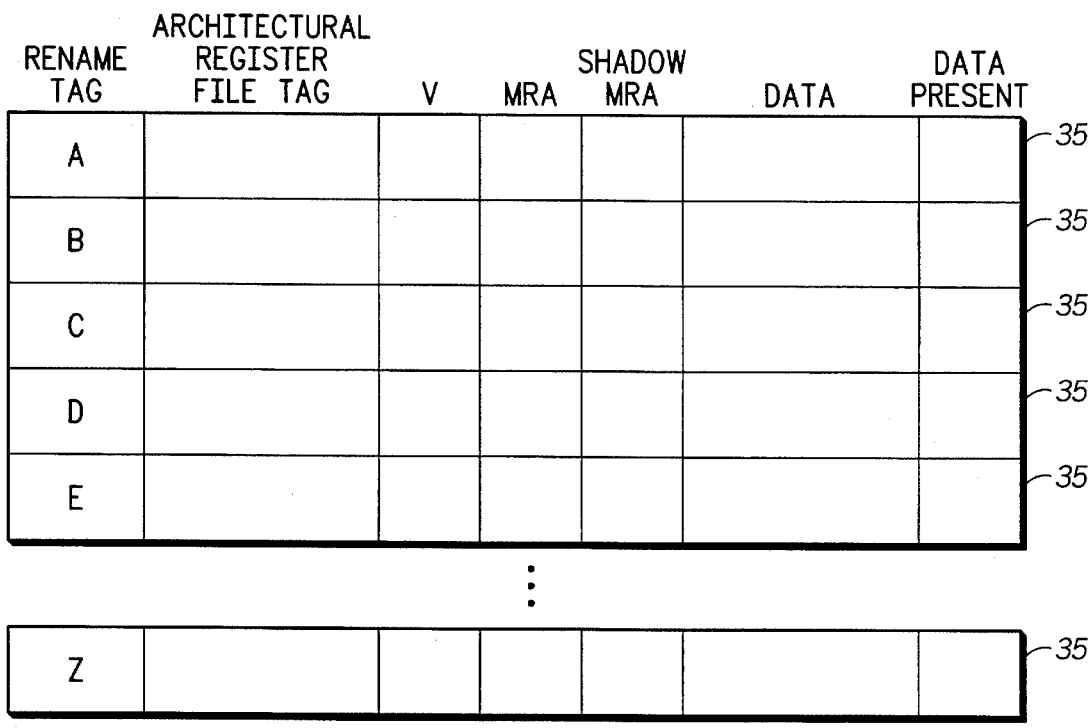
FIG. 2 depicts a block diagram of the rename buffer illustrated in FIG. 1.

FIG. 2 depicts a block diagram of rename buffer 14 illustrated in FIG. 1. Rename buffer 14 has a plurality of memory elements 35 that are operable to store seven data fields/bits: a Rename Tag field, an Architectural Register File Tag field, a Valid bit (labeled "V"), a Most Recently Allocated bit (hereafter simply "MRA bit"), a Shadow MRA bit, a Data field, and a Data Present bit. One memory element 35 is allocated for each instruction that data processor 10 issues. (As known in the art, some instructions may not need a memory element 35.) The number of memory elements in rename buffer 14 may be adjusted to complement the particular level of concurrent instruction execution of a particular data processor.

The Rename Tag field uniquely identifies the particular memory element that is allocated to an instruction. The Rename Tag need not be actually stored in a memory element. Typically, the address of a memory element will suffice to identify the memory element. This field does not change.

The Architectural Register File Tag field identifies the architectural register within architectural register file 16 to which the result of the instruction will ultimately be written. The Architectural Register File Tag is written to when the particular memory element is allocated to a particular instruction.

The Valid bit indicates that the memory element has been allocated to an instruction, i.e. the Architectural Register File Tag field and the MRA bit are valid. The Valid bit is set "invalid" when the associated Data field is written to the specified architectural register. The memory element may then be used to store a subsequent result. The Valid bit is set "valid" when the particular memory element is allocated to an instruction. The function performed by the Valid bit may also be performed by, for instance, a head and a tail pointer with suitable control circuitry. The "valid" memory elements would then correspond to those memory elements having an address less than the address indicated by the head pointer and greater than or equal to the address indicated by the tail pointer. Such an implementation of the Valid bit may be appropriate given certain operating constraints known in the art.

The MRA bit indicates that the particular memory element 35 contains or will contain the latest copy within rename buffer 14 of the architectural register identified by the Architectural Register File Tag field. When a memory element 35 is allocated to a particular instruction at instruction issue, the MRA bit is set to "most recently allocated" and all other MRA bits of memory elements having identical Architectural Register File Tag fields are set to "not most recently allocated." The MRA bits of memory elements having a different Architectural Register File Tags than the instruction issuing are not modified. Memory elements having identical Architectural Register File Tag fields will receive results that are destined for the same architectural register within architectural register file 16. However, for a particular architectural register only one and only the last, most recently allocated rename buffer memory element will ever have a logic level one MRA bit.

The Shadow MRA bit stores a copy of the MRA bit when a data processor 10 performs a speculative branch. This bit is more fully described below in connection with FIGS. 5 through 7.

The Data field contains the result of an associated instruction.

The Data Present bit indicates that the Data field may be used by another instruction and that the Data field is eligible to be written back to the architectural register file. The Data Present bit is set "invalid" when a particular memory element 35 is allocated to an instruction and set "valid" when the particular instruction writes its result to the memory element.

Returning to FIG. 1, in operation, execution unit 12 receives an instruction which may have one or more operands and one or more result destinations associated with the instruction. Hereafter, for purposes of illustration, the exemplary instruction will have a single operand and a single result requiring a single architectural register.

At instruction dispatch, another portion of data processor 10 (not shown) will allocate a particular memory element within rename buffer 14 as the temporary destination of the instruction's result. A memory element in rename buffer 14 is allocated by writing the name of the architectural register to which the result will ultimately be written into the Architectural Register File field of the allocated memory element, by forwarding the rename tag of the allocated memory element to the execution unit that will perform the instruction, and by setting the Valid, MRA and Data Present bits "valid," "most recently allocated" and "not present," respectively. Simultaneously, all MRA bits of memory elements having an identical Architectural Register File field as the allocated memory element are set to a logic state corresponding to "not most recently allocated" (hereafter the Valid, MRA and Data Present bits will be active high signals, i.e. a "valid" Valid bit will correspond to a logic level one and a "data not present signal" will correspond to a logic level zero, etc.).

Sequencer circuitry (not shown) or execution unit 12 forwards the Architectural Register File Tag of a required operand to rename buffer 14 and to architectural register file 16 via result/request tag bus 26 and forward result/request bus 32, respectively.

There are three possible results following an operand request: (1) The operand resides only in an architectural register within architectural register file 16; or (2) The operand resides in a memory element within rename buffer 14 and is present; or (3) The operand resides in a memory element within rename buffer 14 and is not present. In each case, rename buffer 14 performs a compare and forwards an operand, a data valid signal and a Rename Tag to execution unit 18. The compare matches the requested Architectural Register File Tag to each Architectural Register File field having a "valid" Valid bit and a "most recently allocated" MRA bit. The operand and data valid signal are supplied via operand bus 20. The Rename Tag is supplied to execution unit 12 to execution unit 12 via tag bus 22.

Possibility (1) The Operand Resides Only in Architectural Register File 16

In this scenario, the compare produces no matches, i.e. none of the Data fields within rename buffer 14 will be forwarded to the named architectural register. Rename buffer 14 therefore indicates a "miss" (equivalent to the same term in the field of memory caches) to forwarding circuit 18. Forwarding circuit 18 then selects the operand present on operand bus/ARF 34 to forward to execution unit 12 via operand bus 20. While rename buffer 14 was performing its compare, architectural register file 16 selected the value stored in the register identified by the Architectural Register File Tag (the register name) and output the associated data value to operand bus/ARF 34. The data valid signal is always "valid" when architectural register file 16 generates the data. Rename buffer 14 forwards the Rename Tag field associated with the matching memory element to execution unit 12 via tag bus 22. The Rename Tag supplied by rename buffer 14 is ignored by execution unit 12 when the data valid signal corresponds to "operand valid."

Possibility (2) The Operand Resides in Rename Buffer 14 and is Present

In this scenario, one or more entries in rename buffer 14 match the supplied operand name. Rename buffer 14 therefore indicates a "hit" to forwarding circuit 18. Forwarding circuit 18 then selects the operand present on operand bus/RB 28 to forward to execution unit 18 via operand bus 20. Rename buffer 14, however, also compares the Valid bit and MRA bit to logic states corresponding to a "valid" and "most recently allocated" state. This ensures that rename buffer 14 forwards the most recently allocated version of the data value to execution unit 12. The Data Present bit associated with the selected memory element in rename buffer 14 generates the data valid signal when the operand request "hits" in rename buffer 14. By construction, the Data Present bit is a high logic level indicating a present operand. The rename tag supplied by rename buffer 14 is again ignored by execution unit 12.

Possibility (3) The Operand Resides in the Rename Buffer 14 and is Not Present

Also in this scenario, one or more entries in rename buffer 14 match the supplied operand Architectural Register File Tag. Rename buffer 14 therefore indicates a "hit" to forwarding circuit 18. Forwarding circuit 18 selects the operand and present on operand bus/RB 28 to forward to execution unit 18 via operand bus 20. Again, rename buffer 14 forwards the Data field having an Architectural Register File Tag field matching the requested Architectural Register File Tag, a high Valid bit and a high MRA bit to forwarding circuit 18 via operand bus/RB 28. In this scenario, however, the entry is assumed to be "not present." The Data Present bit associated with the selected memory element of rename buffer 14 therefore contains a zero logic state. In the case of an invalid data signal (data not present), execution unit 12 ignores the forwarded operand but latches the rename tag forwarded to it by execution unit 12.

During a subsequent clock cycle, execution unit 12 will monitor result bus 24 and result/request tag bus 26. This process is called "snooping." A second execution unit will eventually return a result that is the desired operand with the operand's associated rename tag. The second execution unit will forward the operand and rename tag to rename buffer 14 via result bus 24 and result/request tag bus 26, respectively. Execution unit 12 will be able to identify this operand by the rename tag on result/request tag bus 26 and can latch the operand at the same time rename buffer 14 latches the operand and rename tag.

FIGS. 3 through 7 depict the contents of the rename buffer 14 illustrated in FIG. 2 at various sequential times. In the illustrated examples, rename buffer 14 has seven memory elements, labeled A through G, that store eight results in eight Data fields for eight architectural registers, labeled 0 through 7 to avoid confusion. In practice, the seven memory elements and eight architectural registers would be identified with binary numbers. Blank entries in FIGS. 3 through 7 indicate that the value of the field is not relevant to the discussion.

Normal Operation

FIG. 3 depicts the contents of rename buffer 14 illustrated in FIG. 2 after memory elements A, B and C have been allocated to three instructions. The Data field of memory element A already contains the result of an instruction (Data Present bit set to a one logic state) that will write to architectural register #4. The Data fields of memory elements B and C will contain the results of two instructions that will write to architectural registers #5 and #7, respectively. These latter instructions have not completed as indicated by the zero logic state of the two corresponding Data Present bits. The MRA bit of all the memory elements reflect that each is or will be the most recent version of some architectural register, here architectural registers #4, #5 and #7. Memory elements D through G are not valid as indicated by the zero logic state of each memory element's Valid bit.

FIG. 4 depicts the contents of rename buffer 14 illustrated in FIG. 2 after an additional memory element, memory element D, has been allocated to some instruction. This additional instruction will write to architectural register #4 like the instruction associated with memory element A. At instruction issue, the MRA bit of memory element D is set to a one logic state and the MRA bit of memory element A is set to a zero logic state. As a result, any later instruction that requests the contents of architectural register #4 will receive the Data field or the Rename Tag field of memory element D depending upon the Data Present bit of memory element D. At the depicted moment, the result of the instruction associated with memory element D is not complete. In that case, rename buffer 14 will forward the Rename Tag field to any execution unit requesting architectural register #4.

Speculative Branching

Rename buffer 14 may be modified to operate within a data processor that supports speculative branching. A data processor that implements a speculative branching scheme is one that branches to one of two (or more) possible instruction streams before the data processor actually determines whether the selected instruction stream is in fact the correct instruction stream. The data processor will continue along its new instruction stream if it later determines that the new instruction stream is correct. The data processor will stop issuing instructions along the selected path, however, if it determines that it "guessed" incorrectly. The data processor will then attempt to reverse the affects of the instructions issued along the incorrect path and issue instructions along the correct path. It should be understood that either one of the possible instructions streams may serially follow the first instruction stream or may require a jump to a different point in software. The speculative branching feature is illustrated below in FIGS. 5 through 7.

FIG. 5 depicts the contents of rename buffer 14 illustrated in FIG. 2 if data processor 10 takes a speculative branch after issuing the four instructions described above in connection with FIGS. 3 and 4. Rename buffer 14 saves a copy of each MRA bit in the Shadow MRA bit associated with each MRA bit. Specifically, the Shadow MRA bit of A memory element equals the MRA bit of A memory element, the Shadow MRA bit of B memory element equals the MRA bit of B memory element, etc.

FIG. 6 depicts the contents of rename buffer 14 illustrated in FIG. 2 after data processor 10 issues one instruction from the new instruction stream. This next instruction is allocated memory element E and will write to architectural register #5. As a result, rename buffer 14 sets the MRA bit of memory element B to a zero logic state to reflect that memory element E will contain the most recently allocated version of architectural register #5. The Shadow MRA bits are not modified.

If data processor 10 "guessed" the correct instruction path when it branched speculatively, then data processor 10 will continue along the same instruction stream. Rename buffer 14 will ignore its Shadow MRA bits until data processor 10 takes a second speculative branch. At that point, rename buffer 14 will again copy the MRA bits into the Shadow MRA bits, overwriting the vector illustrated in FIG. 6. If, however, data processor 10 guessed incorrectly, then rename buffer 14 will copy the Shadow bits back into the associated MRA bits. Rename buffer 14 or, perhaps, a branch unit of data processor 10 will also invalidate all instructions along the incorrect instruction stream.

Figures 7, 8:
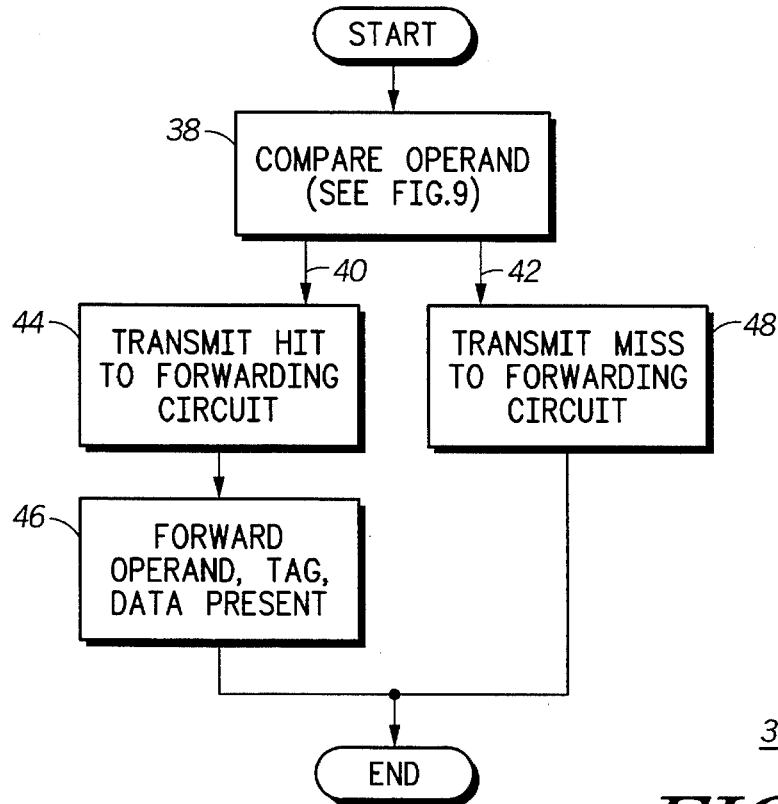

FIG. 7 depicts the contents of rename buffer 14 illustrated in FIG. 2 after data processor 10 determines that it followed an incorrect instruction stream. Rename buffer 14 invalidates memory element E and copies the contents of the Shadow bits back into the MRA bits. In the present illustration only one instruction issued before data processor 10 determined the correct instruction stream to follow. Therefore, only one memory element needed to be invalidated and only one MRA bit needed to be restored. The disclosed procedure, however, will produce the same results given any number of incorrectly issued instructions.

The number of Shadow bits per memory element may be increased to support multiple levels of speculative branching. For instance, it may be desirable for data processor 10 to be able to take a second speculative branch before it determines if the first speculative branch was correct. In this case, a second Shadow MRA bit may be provided for each memory element. Upon execution of the second outstanding speculative branch, the contents of the MRA bits would be stored in the second Shadow MRA bits. Rename buffer 14 will then restore the Nth Shadow MRA bits to the MRA bits if the data processor's branch unit determines that the Nth outstanding speculative branch is incorrect (where N is an integer index). In general, one Shadow MRA bit may be provided for each level of speculative branching that is desired.

FIG. 8 depicts a flow chart 36 of one set of steps operable to implement the disclosed invention. Rename buffer 14 performs flow chart 36 each time an operand is requested by some execution unit. Rename buffer 14 compares the Architectural Register File Tag of the requested operand to each Architectural Register File Tag field in rename buffer 14 for a match, step 38. Rename buffer 14 then branches to a path 40 or to a path 42 depending upon whether rename buffer 14 finds a match or does not find a match, respectively. Step 38 is more fully described below in connection with FIG. 9.

Continuing along path 40, rename buffer 14 will transmit a "hit" signal to forwarding circuit 18 indicating that forwarding circuit 18 should forward the operand supplied by rename buffer 14 to operand bus 20, step 44. Rename buffer 14 will then forward the matching rename tag field and Data field (if any) and the Data Present bit to execution unit 18, step 46. As described above, execution unit 18 will disregard certain of these fields depending upon the value of the Data Present field.

Continuing along path 42, rename buffer 14 will transmit a "miss" signal to forwarding circuit 18 indicating that forwarding circuit 18 should forward the operand supplied by architectural register file 16, step 48. Rename buffer 14 may or may not forward any other data to execution unit 12 depending upon the implementation details of rename buffer 14. Regardless, according to the protocol described above, any data forwarded to execution unit 12 will be ignored given the valid data signal supplied by architectural register file 16.

Both paths within flow chart 36 then merge at the end of flow chart 36.

Figure 9:
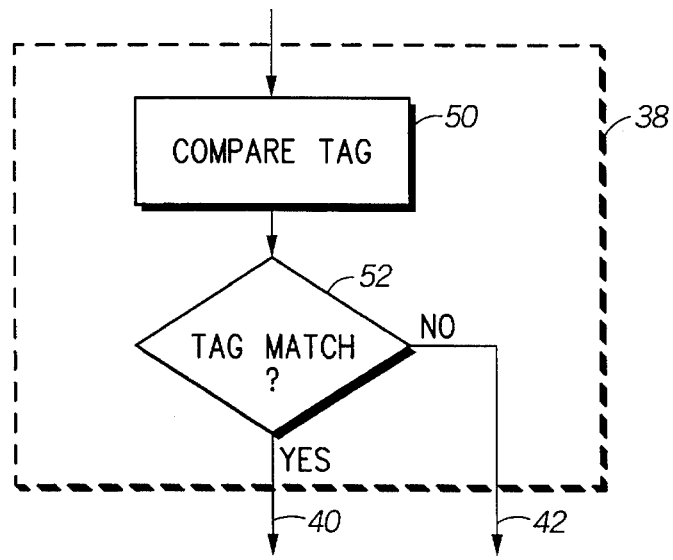
FIG. 9 depicts a flow chart of one set of steps operable to implement one step illustrated in FIG. 8.

FIG. 9 depicts a flow chart of one set of steps operable to implement step 38 illustrated in FIG. 8. Rename buffer 14 performs a tag compare, step 50. As described above, rename buffer compares, respectively, (1) the tag of the requested operand, a one logic level, and a one logic level to (2) the Architectural Register File Tag field, the Valid bit, and the MRA bit of each memory element 35. Rename buffer 14 then branches, in step 52, to path 40 or 42 depending upon whether or not it found a match in step 50. The details of compare step 50 will depend upon the hardware implementation of the memory elements in rename buffer 14. For instance, if rename buffer 14 is designed as a small block of Random Access Memory ("RAM") cells, then step 50 may involve an iterative loop in which a memory cell is addressed according to an indexed counter, the memory cell contents are compared, and the counter is incremented if no match is found. Conversely, rename buffer 14 may be a small block of content addressable memory ("CAM") cells. If the rename buffer 14 is a block of CAM cells, then the contents of each CAM cell may be compared to the input operand tag in parallel with each other. The CAM cell having the desired fields will automatically output its Rename Tag field, DATA field, and Data Present bit.

Figure 10:
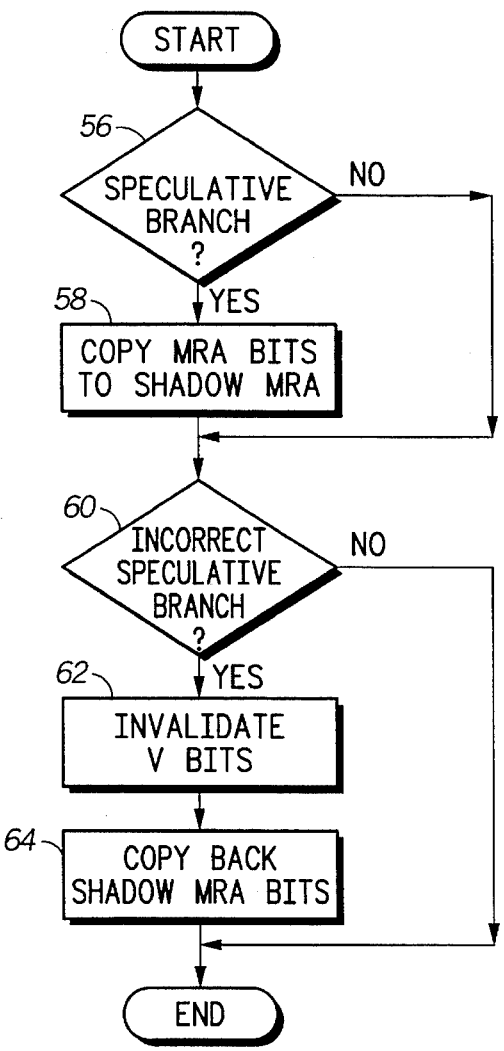
FIG. 10 depicts a flow chart of one set of steps operable to implement the disclosed invention.

FIG. 10 depicts a flow chart 54 of one set of steps operable to implement the disclosed invention. In particular, flow chart 54 illustrates how rename buffer 14 may incorporate the speculative branching feature described above in connection with FIGS. 5 through 7. Rename buffer 14 may execute the steps depicted in FIG. 10 at the beginning of each data processor clock cycle. Rename buffer 14 determines if data processor 10 takes a speculative branch, step 56. If data processor 10 has taken a speculative branch, then rename buffer 14 copies each MRA bit to the associated Shadow MRA bit, step 58. Flow chart 54 then flows to step 60. If data processor 10 does not take a speculative branch, then rename buffer 14 flows directly to step 60 from step 58.

Rename buffer 14 then determines if a data processor indicates that data processor 10 followed an incorrect instruction stream, step 60. If data processor 10 did follow an incorrect instruction stream, then rename buffer 14 invalidates each Valid bit associated with an instruction that followed the speculative branch instruction, step 62. Rename buffer 14 also copies each Shadow MRA bit back to the corresponding MRA bit, step 64. Rename buffer 14 then flows to the end of flow chart 54. If data processor 10 did not follow an incorrect instruction stream, then rename buffer 14 flows directly to the end of flow chart 54 from step 60.

Although the present invention has been described with reference to a specific embodiment, further modifications and improvements will occur to those skilled in the art. For instance, many of the functions attributed above to a particular portion of data processor 10 may be performed by a different portion of a particular data processor. The name of the unit performing a necessary function or the division of labor among a group of units, therefore, is not part of the invention. It is to be understood therefore, that the invention encompasses all such modifications that do not depart from the spirit and scope of the invention as defined in the appended claims.

What is claimed is:

1. A data processor comprising:

a plurality of execution units, the execution units operable to perform a plurality of instructions received from a memory system, at least one of the plurality of instructions requiring an operand, at least one of the plurality of instructions generating a result;

a plurality of architectural registers coupled to at least one of the execution units, the plurality of architectural registers supplying operands to the at least one of the plurality of execution units, the plurality of architectural registers periodically receiving the result of the at least one instruction generating a result;

a plurality of memory means, each memory means storing a result, a tag representative of the architectural register associated with the result and a first-most-recently-allocated bit and a second-most-recently-allocated bit each associated with the result;

allocation means coupled to at least one of the execution units and to the plurality of memory means, the allocation means periodically receiving a first tag identifying an architectural register, storing the first tag in a predetermined one of the memory means, setting the first-most-recently-allocated bit associated with the predetermined one of memory means to a first logic state, setting each first-most-recently-allocated bit of a subset of the memory elements to a second logic state, the subset of memory elements comprising a tag logically equivalent to the first tag, and storing each first-most-recently-allocated bit in an associated second-most-recently-allocated bit location responsive to a speculative branch;

forwarding means coupled to at least one of the execution units and to the plurality of memory means, the forwarding means receiving a request for an operand, the request comprising the first tag, the forwarding means comparing the first tag to each tag stored in the plurality of memory means, and forwarding a selected result to an execution unit responsive to the step of comparing, the selected result associated with a selected one of the plurality of memory means, the selected one of the plurality of memory means comprising a tag and a first-most-recently-allocated bit corresponding in logic state to the first one of the architectural registers and to the first logic state of the first-most-recently-allocated bit, respectively; and tag means coupled to the forwarding means to forward an address of the one of the plurality of memory means associated with the selected result.

2. A method of operating a data processor comprising the steps of:

at a first time, storing a first tag and a first first-most-recently-allocated bit in a tag field and in a first-most-recently-allocated-bit-field, respectively, of a first one of a plurality of sets, each one of the plurality of sets comprising a tag field, a first-most-recently-allocated-bit-field, and a second-most-recently-allocated-bit-field, the first tag identifying an address of a first memory cell associated with a first result, the first result being an output of a first instruction executed by an execution unit of the data processor, the first first-most-recently-allocated bit associated with the first result, the first first-most-recently-allocated bit assuming a first logic state;

at a second time subsequent to the first time, storing a second tag and a second first-most-recently-allocated bit in a second one of the plurality of sets, the second tag identifying an address of a memory cell associated with a second result and the second first-most-recently-allocated bit associated with the second result, the second result being an output of a second instruction executed by the execution unit, the second first-most-recently-allocated bit assuming the first logic state, and storing a second logic state in the first-most-recently-allocated bit field of a subset of the plurality of sets, each of the contents of the tag fields of the subset of the plurality of sets logically equivalent to the second tag:

at a third time, receiving a requested tag of a requested result, comparing the requested tag and the first logic state to the tag field and to the first-most-recently-allocated bit field, respectively, of each of the plurality of sets, forwarding a result associated with a selected set, the contents of the tag field and the contents of the first-most-recently-allocated-bit-field of the selected set logically equivalent to the requested tag and the first logic state;

at a fourth time subsequent to the first time, receiving the first result from a communication bus within the data processor and storing the first result in the first memory cell; and at a fifth time subsequent to the first time, issuing a speculative branch instruction to the execution unit and storing the contents of each first-most-recently-allocated bit field in an associated second-most-recently-allocated bit field.

* * * * *